US010267476B2

(12) United States Patent
Ugajin et al.

(10) Patent No.: US 10,267,476 B2
(45) Date of Patent: Apr. 23, 2019

(54) VEHICLE LAMP

(71) Applicant: KOITO MANUFACTURING CO., LTD., Tokyo (JP)

(72) Inventors: Yuta Ugajin, Shizuoka (JP); Kenichi Takada, Shizuoka (JP); Akira Hanada, Shizuoka (JP); Takaya Shimizu, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/842,096

(22) Filed: Dec. 14, 2017

(65) Prior Publication Data

US 2018/0172231 A1 Jun. 21, 2018

(30) Foreign Application Priority Data

Dec. 15, 2016 (JP) ................................ 2016-243718
Jan. 19, 2017 (JP) ................................ 2017-007772

(51) Int. Cl.

| | |
|---|---|
| ***B60Q 1/00*** | (2006.01) |
| ***F21S 41/36*** | (2018.01) |
| ***F21S 41/25*** | (2018.01) |
| ***F21S 41/141*** | (2018.01) |
| ***F21S 41/19*** | (2018.01) |
| ***F21S 41/147*** | (2018.01) |
| ***F21S 41/29*** | (2018.01) |
| ***F21S 41/255*** | (2018.01) |
| ***F21S 41/39*** | (2018.01) |
| ***F21S 41/32*** | (2018.01) |
| ***F21S 41/663*** | (2018.01) |
| ***F21S 45/47*** | (2018.01) |

(Continued)

(52) U.S. Cl.

CPC ............ *F21S 41/36* (2018.01); *F21S 41/141* (2018.01); *F21S 41/147* (2018.01); *F21S 41/151* (2018.01); *F21S 41/19* (2018.01); *F21S 41/192* (2018.01); *F21S 41/25* (2018.01); *F21S 41/255* (2018.01); *F21S 41/295* (2018.01); *F21S 41/321* (2018.01); *F21S 41/39* (2018.01); *F21S 41/663* (2018.01); *F21S 45/435* (2018.01); *F21S 45/47* (2018.01); *F21Y 2103/10* (2016.08); *F21Y 2115/10* (2016.08)

(58) Field of Classification Search

CPC ... F21S 48/145; F21S 48/1388; F21S 48/1159
USPC .......................................................... 362/538
See application file for complete search history.

(56) References Cited

U.S. PATENT DOCUMENTS

2006/0120094 A1 6/2006 Tsukamoto et al.
2012/0294024 A1 * 11/2012 Peck ....................... B60Q 1/06 362/516

(Continued)

FOREIGN PATENT DOCUMENTS

JP 2006-164735 A 6/2006
JP 5512183 B2 6/2014

*Primary Examiner* — Ahshik Kim
(74) *Attorney, Agent, or Firm* — Sughrue Mion, PLLC

(57) ABSTRACT

A lamp includes a plurality of light sources arranged in parallel, a projection lens through which light emitted from the plurality of light sources is transmitted, and a first inter-light source reflector and a second inter-light source reflector which are disposed so as to sandwich a line connecting the light sources adjacent to each other and which are configured to reflect a part of the light emitted from the light sources toward the projection lens.

12 Claims, 8 Drawing Sheets

(51) Int. Cl.

| | |
|---|---|
| ***F21S 45/435*** | (2018.01) |
| ***F21S 41/151*** | (2018.01) |
| *F21Y 103/10* | (2016.01) |
| *F21Y 115/10* | (2016.01) |

(56) References Cited

U.S. PATENT DOCUMENTS

2015/0338047 A1* 11/2015 Honda ................ F21S 48/1388
362/517
2016/0091165 A1* 3/2016 Saito .................... B60Q 1/0683
362/509
2017/0227184 A1* 8/2017 Ishida ................. F21S 48/1747

* cited by examiner

VEHICLE LAMP

CROSS-REFERENCE TO RELATED APPLICATION

This application claims priorities from Japanese Patent Applications No. 2016-243718 filed on Dec. 15, 2016 and No. 2017-007772 filed on Jan. 19, 2017, the entire contents of which are incorporated herein by reference.

FIELD

The present invention relates to a lamp.

BACKGROUND

Recently, from the viewpoint of energy saving or the like, an LED (Light Emitting Diode) is used as a light source of various lamps. For example, the following Patent Document 1 discloses a vehicle headlamp using an LED as a light source.

In many cases, a plurality of LEDs is used in combination in a lamp. Also in a vehicle headlamp disclosed in Patent Document 1, a plurality of LEDs arranged in parallel is used as a light source. Further, in the vehicle headlamp disclosed in the following Patent Document 1, a lattice-like guide element surrounding each LED is provided in order to control the light distribution of light emitted from the plurality of LEDs arranged in parallel.

As a vehicle headlamp typified by an automotive headlight, in addition to a low-beam light source that illuminates the front at night, one having a high-beam light source or the like that illuminates a distance farther than the low beam mounted thereon is known. The light from the high-beam light source contains light irradiated above the low beam. Further, a vehicle headlamp in which these light sources are provided in one lamp unit is known.

For example, the following Patent Document 1 discloses a vehicle illumination lamp which is provided with a first light emitting element for emitting light upward, a first reflector disposed so as to cover the first light emitting element from above, a second light emitting element for emitting light downward, a second reflector disposed so as to cover the second light emitting element from below, and a projection lens through which light emitted from the first light emitting element and light emitted from the second light emitting element are transmitted.

Patent Document 1: Japanese Patent Publication No. 5512183

Patent Document 2: Japanese Patent Laid-Open Publication No. 2006-164735

In the case where a lattice-like guide element surrounding each of a plurality of light sources is provided as in the vehicle headlamp disclosed in the above Patent Document 1, at least a part of the light emitted from a light source provided on one side of the guide element and directed toward the other side of the guide element is shielded by the guide element. Accordingly, there is a case where a shadow due to the guide element formed between adjacent light sources can be formed in the light distribution formed by the light emitted from a plurality of light sources.

SUMMARY

Therefore, the present invention aims to provide a lamp in which the occurrence of a shadow in the light distribution of the light emitted from a plurality of light sources arranged in parallel can be suppressed.

In the vehicle illumination lamp disclosed in the above Patent Document 1, the light emitted from the first light emitting element is emitted upward with respect to an optical axis of the projection lens, and the light emitted from the second light emitting element is emitted downward with respect to the optical axis of the projection lens. In order that the light emitted in this manner enters the projection lens arranged in front of the first light emitting element and the second light emitting element, it is necessary to reflect the light emitted from the first light emitting element toward the front by the first reflector and reflect the light emitted from the second light emitting element toward the front by the second reflector.

In the vehicle illumination lamp disclosed in the above Patent Document 1, in order to cause the light emitted from the first light emitting element and the light emitted from the second light emitting element to effectively enter the projection lens, it is preferable that the first reflector and the second reflector are respectively provided so as to largely protrude forward. However, when the first reflector and the second reflector are increased in size in this manner, the size of the lamp is liable to be increased.

Therefore, the present invention aims to provide a lamp which is provided with a plurality of light sources for emitting light in directions different from each other and in which an increase in size can be suppressed while effectively utilizing the light from these light sources.

In order to achieve the above objects, the lamp of the present invention includes:

a plurality of light sources arranged in parallel, a projection lens through which light emitted from the plurality of light sources is transmitted, and a first inter-light source reflector and a second inter-light source reflector which are disposed so as to sandwich a line connecting the light sources adjacent to each other and which are configured to reflect a part of the light emitted from the light sources toward the projection lens.

Since the first inter-light source reflector and the second inter-light source reflector are provided, a part of the light spreading in the arrangement direction of the plurality of light sources among the light emitted from the plurality of light sources can be reflected toward the projection lens. Therefore, it is easy to effectively utilize the light emitted from the plurality of light sources. Further since the first inter-light source reflector and the second inter-light source reflector are disposed so as to sandwich the line connecting the mutually adjacent light sources, a gap through which light can pass in a direction parallel to the line connecting the mutually adjacent light sources is formed between the first inter-light source reflector and the second inter-light source reflector. Therefore, out of the light emitted from the plurality of light sources, other part of the light, which is emitted in a direction parallel to the arrangement direction of the plurality of light sources, can pass between the first inter-light source reflector and the second inter-light source reflector. As such, the light emitted while spreading in the direction parallel to the arrangement direction of the plurality of light sources is not completely shielded by the first inter-light source reflector and the second inter-light source reflector. Therefore, it is possible to suppress the occurrence of a shadow due to the first inter-light source reflector and the second inter-light source reflector in the light distribution of the light emitted from the plurality of light sources.

Further, it is preferable that the lamp further includes a pair of reflectors formed along an arrangement direction of the plurality of light sources and disposed so as to sandwich the plurality of light sources from upper and lower sides.

Since the reflectors are provided so as to sandwich the plurality of light sources as described above, it is easy to more effectively utilize the light emitted from the plurality of light sources.

Further, it is preferable that the first inter-light source reflector is formed integrally with one of the pair of reflectors, and the second inter-light source reflector is formed integrally with the other of the pair of reflectors.

Since the first inter-light source reflector and the second inter-light source reflector are formed integrally with the pair of reflectors, the relative positions of these reflectors are easily determined, and thus, it is easy to accurately control the light distribution of the light emitted from the plurality of light sources.

Further, it is preferable that a plurality of first inter-light source reflectors and a plurality of second inter-light source reflectors are arranged in parallel along an arrangement direction of the plurality of light sources, and leading ends of the plurality of first inter-light source reflectors on a side of the projection lens and leading ends of the plurality of second inter-light source reflectors on a side of the projection lens are positioned gradually closer to a side of the projection lens from the first inter-light source reflector and the second inter-light source reflector disposed at the center toward the first inter-light source reflectors and the second inter-light source reflectors disposed at both ends.

As described above, out of the light emitted from the plurality of light sources, a part of the light, which is emitted in the direction parallel to the arrangement direction of the plurality of light sources, is reflected forward by the first inter-light source reflector and the second inter-light source reflector, and other part thereof passes between the first inter-light source reflector and the second inter-light source reflector. Here, when a plurality of first inter-light source reflectors and a plurality of second inter-light source reflectors are arranged in parallel as described above, the light passing between the first inter-light source reflectors and the second inter-light source reflectors is likely to increase cumulatively from the center toward both ends. Thus, as described above, the first inter-light source reflectors and the second inter-light source reflectors disposed at both ends are provided so as to protrude forward beyond the first inter-light source reflector and the second inter-light source reflector disposed at the center. By doing so, a relatively small reflector is arranged at a place where light is relatively small, and a relatively large reflector is arranged at a place where light is relatively large. Therefore, it is easy to uniformly reflect the light emitted from the plurality of light sources toward the projection lens.

In order to achieve the above object, the lamp of the present invention includes:

a first light source which emits a first light, a second light source which is disposed below the first light source and emits a second light, a projection lens which is disposed in front of the first light source and the second light source and through which the first light and the second light are transmitted, and a shade which is disposed between the first light source and the second light source and which shields a part of the first light.

The shade has:

a first concave reflective surface that extends from a side of the first light source toward the projection lens and reflects a part of the first light forward, and a second concave reflective surface that extends from a side of the second light source toward the projection lens and reflects a part of the second light forward.

The normal line of an emitting surface of the first light source faces obliquely toward lower front, and the normal line of an emitting surface of the second light source faces obliquely toward upper front.

In the lamp, since the normal line of the emitting surface of the first light source faces obliquely toward the lower front, a part of the first light can be directly incident on the projection lens and other part of the first light can be incident on the projection lens by being reflected by a first reflective surface disposed below the first light source. In this way, it is possible to effectively utilize the first light. Further, since the normal line of the emitting surface of the second light source faces obliquely toward the upper front, a part of the second light can be directly incident on the projection lens and other part of the second light can be incident on the projection lens by being reflected by a second reflective surface disposed above the second light source. Therefore, it is possible to effectively utilize the second light. In addition, since the first reflective surface and the second reflective surface are formed on one surface and the other surface of the shade, the first reflective surface and the second reflective surface can be formed by a single member. Further, since it is assumed that each of a part of the first light and a part of the second light is directly incident on the projection lens, it is not necessary to cause the first reflective surface and the second reflective surface to largely protrude forward. In this way, in the lamp, it is possible to make the first light and the second light efficiently incident on the projection lens even without using a large reflector. As a result, the lamp is provided with a plurality of light sources for emitting light in directions different from each other and an increase in size thereof can be suppressed while effectively utilizing the light from these light sources.

Further, it is preferable that a focal point of the projection lens is formed between a front end of the shade and the projection lens.

Since a part of the first light is shielded by the shade as described above, the front end of the shade can form a cut line of the light distribution by the first light. Further, as described above, the normal line of the emitting surface of the first light source faces obliquely toward the lower front and the normal line of the emitting surface of the second light source faces obliquely toward the upper front. Therefore, the first light and the second light are emitted toward the front end of the shade, and thus, the vicinity of the front end of the shade is likely to become brighter. Here, by forming the focal point of the projection lens between the front end of the shade and the projection lens, that is, in the vicinity of the front end of the shade, the vicinity of the cut line can be made brighter.

Further, it is preferable that, in vertical section, the first light source and the second light source are arranged at positions that are asymmetrical with respect to an optical axis of the projection lens.

Further, it is preferable that at least one of the first light reflected by the first reflective surface and the second light reflected by the second reflective surface is reflected forward with a divergence angle made smaller.

Since the divergence angle of the first light reflected forward by the first reflective surface is reduced, the first light can be collected in a predetermined angle, and then, can be incident on projection lens. Therefore, a predetermined range of the light distribution of the first light can be relatively brighter than the other range. For example, the vicinity of the cut line can be made brighter. Further, since the divergence angle of the second light reflected forward by the second reflective surface is reduced, the second light can be collected in a predetermined angle, and then, can be incident on projection lens. Therefore, a predetermined range of the light distribution of the second light can be relatively brighter than the other range. For example, a portion where the light distribution of the first light and the light distribution of the second light overlap with each other can be made brighter.

Further, it is preferable that the headlamp further includes a third reflective surface covering an upper side of the first light source, and a fourth reflective surface covering a lower side of the second light source.

Since the third reflective surface and the fourth reflective surface as described above are provided, it is easy to more effectively utilize the first light and the second light. Meanwhile, most of the first light emitted from the first light source is directly incident on the projection lens or is incident on the projection lens by being reflected by the first reflective surface. Unlike the reflector disclosed in the above Patent Document 1, the third reflective surface is not intended to reflect all of the light emitted from the light source. Therefore, the third reflective surface can be made smaller than that of the reflector disclosed in the above Patent Document 1. Further, as described above, most of the second light emitted from the 20 second light source is directly incident on the projection lens or is incident on the projection lens by being reflected by the second reflective surface. Therefore, similar to the third reflective surface, the fourth reflective surface can be also made smaller.

Further, it is preferable that at least one of the first light reflected by the third reflective surface and the second light reflected by the fourth reflective surface is diverged.

Since the first light reflected by the third reflective surface is diverged, the first light can be irradiated in a wide range. Further, since the second light reflected by the fourth reflective surface is similarly diverged, the second light can be irradiated in a wide range.

Further, it is preferable that at least one of the first light source and the second light source is constituted by an LED array When the first light source and the second light source are constituted by the LED array, it is easy to control the light distribution of the first light source and the light distribution of the second light source by controlling the lighting pattern of each LED included in the LED array.

Further, it is preferable that a front end of the shade is gradually recessed rearward from left and right ends toward center.

Since the front end of the shade has the above shape, it is easy to form the cut line into a desired shape.

As described above, according to the present invention, there is provided a lamp in which the occurrence of a shadow in the light distribution of the light emitted from a plurality of light sources arranged in parallel can be suppressed.

As described above, according to the present invention, there is provided a lamp which is provided with a plurality of light sources for emitting light in directions different from each other and in which an increase in size can be suppressed while effectively utilizing the light from these light sources.

EMBODIMENTS

Hereinafter, embodiments of a lamp according to the present invention will be illustrated with accompanying drawings. The embodiments illustrated below are intended for facilitating the understanding of the present invention and are not intended to limitedly interpret the present invention. The present invention can be modified and improved from the following embodiments without departing from the gist thereof.

Hereinafter, a vehicle headlamp which is an example of a lamp of the present invention will be described. The vehicle headlamp is generally provided in each of the left and right directions ahead of a vehicle, and the left and right vehicle headlamps are configured to be substantially symmetrical in the left and right direction. Accordingly, in the present embodiment, the vehicle headlamp on one side will be described.

Figure 1:
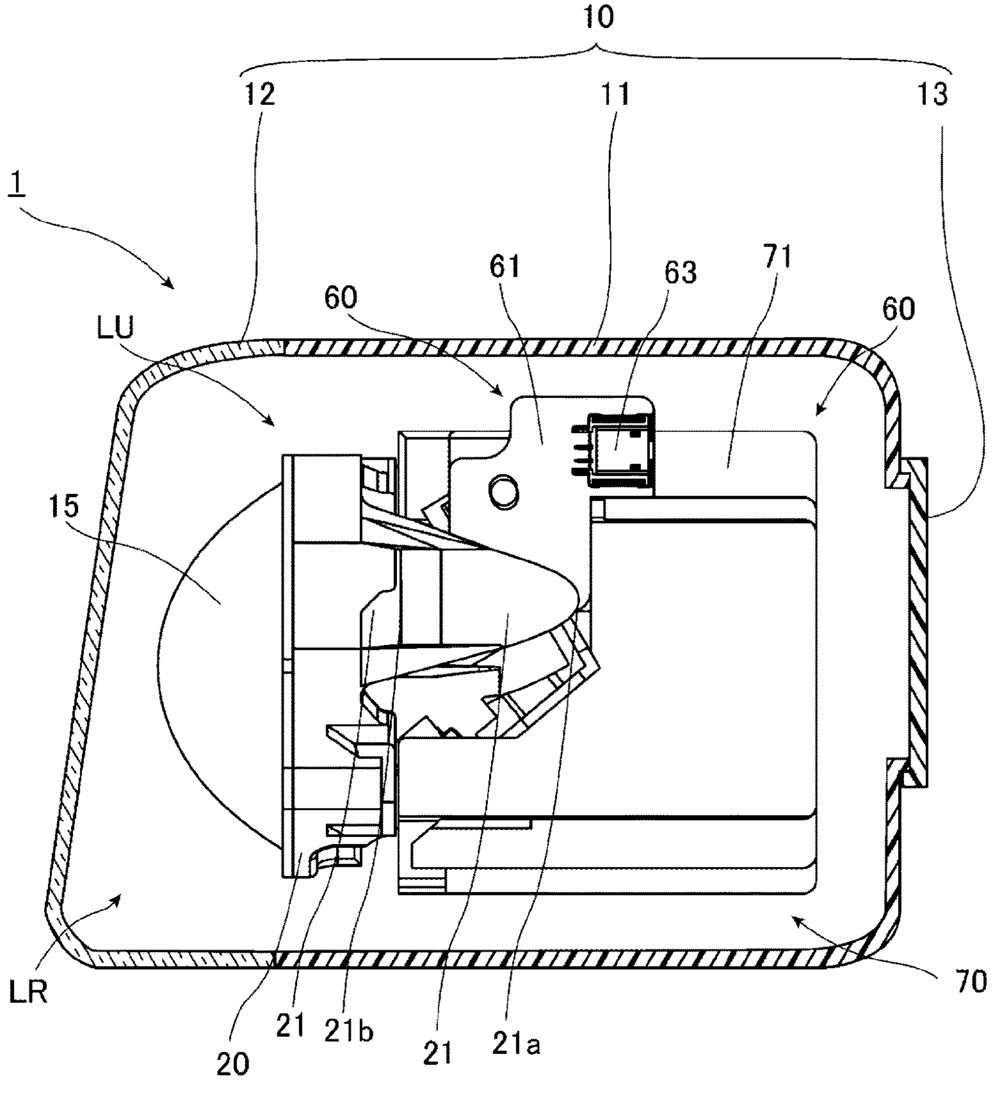
FIG. 1 is a view showing a lamp unit according to an embodiment of the present invention and a housing accommodating the lamp unit.

FIG. 1 is a view showing a lamp unit according to the present embodiment and a housing accommodating the lamp unit. Meanwhile, a side view of the lamp unit and a sectional view of the housing are shown in FIG. 1.

As shown in FIG. 1, a vehicle headlamp 1 of the present embodiment includes a housing 10, and a lamp unit LU accommodated in the housing 10.

The housing 10 mainly includes a lamp housing 11, a front cover 12, and a back cover 13. The front of the lamp housing 11 is opened. The front cover 12 with light transparency is fixed to the lamp housing 11 so as to close the front opening. Further, an opening smaller than the front opening is formed on the rear of the lamp housing 11. The back cover 13 is fixed to the lamp housing 11 so as to close the rear opening.

A space formed by the lamp housing 11, the front cover 12 closing the front opening of the lamp housing 11, and the back cover 13 closing the rear opening of the lamp housing 11 is formed as a lamp chamber LR in which the lamp unit LU is accommodated.

Figure 2:
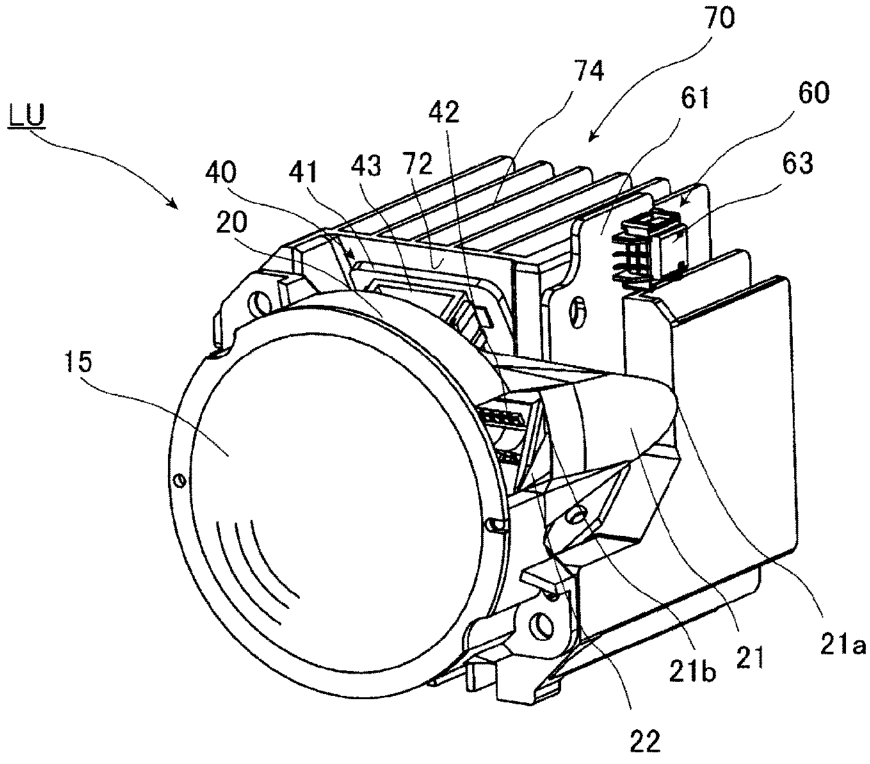
FIG. 2 is a perspective view of the lamp unit shown in FIG. 1.
Figure 3:
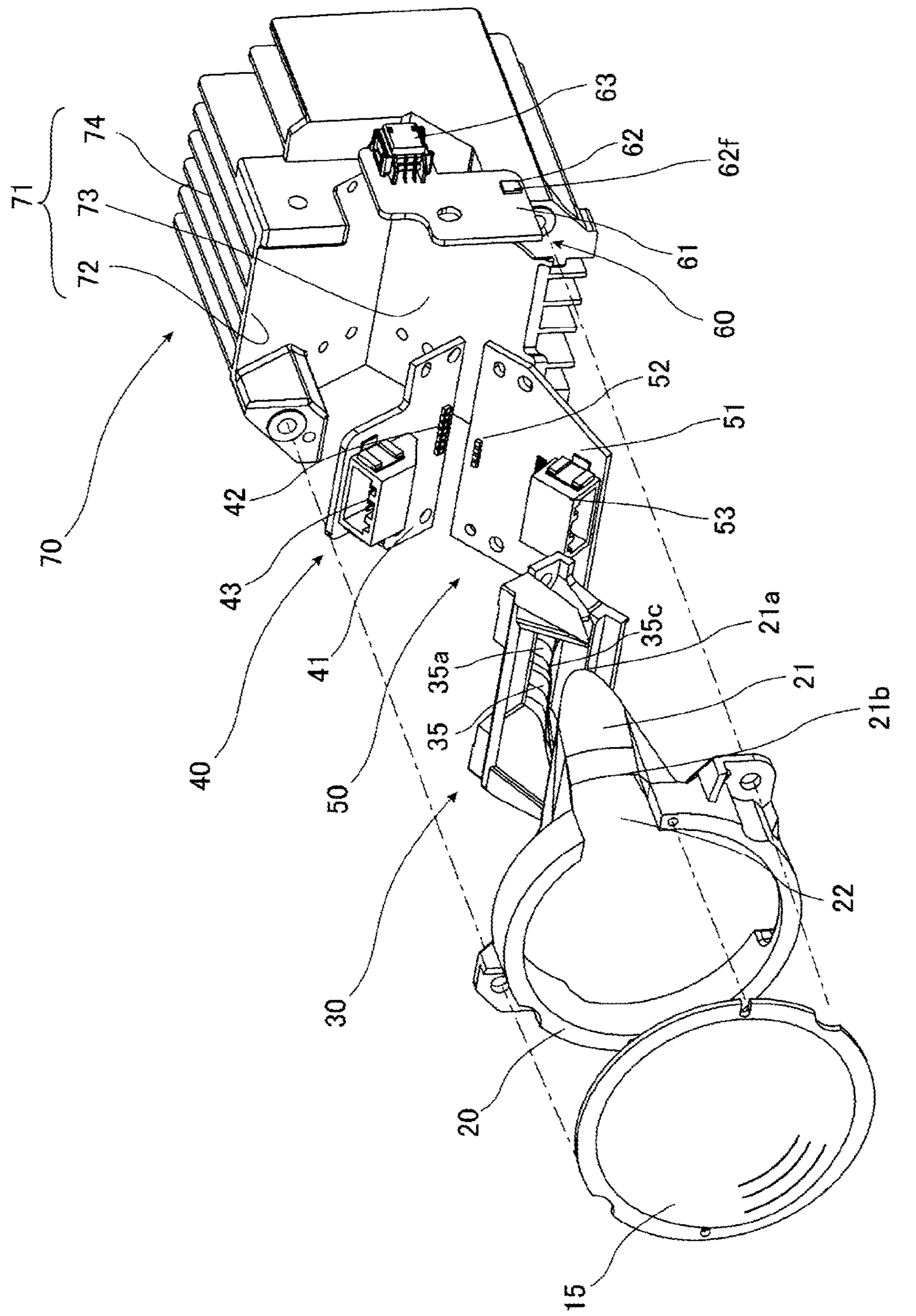
FIG. 3 is an exploded perspective view of the lamp unit shown in FIG. 1.

FIG. 2 is a perspective view of the lamp unit shown in FIG. 1. FIG. 3 is an exploded perspective view of the lamp unit LU shown in FIG. 2.

As shown in FIGS. 2 and 3, the lamp unit LU mainly includes a projection lens 15, a lens holder 20, a reflector unit 30, a first light source unit 40, a second light source unit 50, a third light source unit 60, and a cooling unit 70.

The cooling unit 70 mainly includes a heat sink 71 and a cooling fan 75. The heat sink 71 has a first base portion 72, a second base portion 73, and heat-dissipation fins 74. The first base portion 72 is a plate-like member extending obliquely toward the upper front and in the left and right direction, and the second base portion 73 is a plate-like member extending obliquely toward the lower front from a lower end of the first base portion 72 and in the left and right direction. The heat-dissipation fins 74 are formed on the rear surfaces of the first base portion 72 and the second base portion 73. The cooling fan 75 is provided on the rear surface side of the heat-dissipation fins 74.

The first light source unit 40 mainly includes a first substrate 41, a first light source 42, and a first connector 43. The first substrate 41 is a plate-like member and is made of for example, metal. The first light source 42 is disposed on the first substrate 41 and emits a first light to be a low beam. The first light source 42 is composed of a plurality of light sources arranged in parallel. The first light source 42 in the present embodiment is an LED array composed of a plurality of LEDs arranged in parallel. By controlling the lighting pattern of each LED included in the LED array, the light distribution of the first light emitted from the first light source 42 can be controlled. The lighting pattern of the first light source 42 is controlled by inputting an electric signal to a light emission control circuit (not shown) via the first connector 43 provided on the first substrate 41.

Since the first substrate 41 is superimposed and fixed to a front surface of the first base portion 72 of the cooling unit 70, the surface of the first substrate 41 is substantially parallel to the front surface of the first base portion 72. Since the first base portion 72 extends obliquely toward the upper front as described above, the surface of the first substrate 41 also extends obliquely toward the upper front. Further, an emitting surface of the first light source 42 fixed to the first substrate 41 is substantially parallel to the surface of the first substrate 41. Therefore, the normal line of the emitting surface of the first light source 42 faces obliquely forward and downward.

The second light source unit 50 mainly includes a second substrate 51, a second light source 52, and a second connector 53. The second substrate 51 is a plate-like member and is made of, for example, metal. The second light source 52 is disposed on the second substrate 51 and emits a second light to be a high beam. The second light source 52 is composed of a plurality of light sources arranged in parallel. The second light source 52 in the present embodiment is an LED array composed of a plurality of LEDs arranged in parallel. By controlling the lighting pattern of each LED included in the LED array, the light distribution of the second light emitted from the second light source 52 can be controlled. The lighting pattern of the second light source 52 is controlled by inputting an electric signal to a light emission control circuit (not shown) via the second connector 53 provided on the second substrate 51.

Since the second substrate 51 is superimposed and fixed to a front surface of the 15 second base portion 73 of the cooling unit 70, the surface of the second substrate 51 is substantially parallel to the front surface of the second base portion 73. Since the second base portion 73 extends obliquely toward the lower front as described above, the surface of the second substrate 51 also extends obliquely toward the lower front. Further, an emitting surface of the second light source 52 fixed to the second substrate 51 is substantially parallel to the surface of the second substrate 51. Therefore, the normal line of the emitting surface of the second light source 52 faces obliquely forward and downward.

As described above, the first light source 42 is fixed to the first base portion 72, and the second light source 52 is fixed to the second base portion 73. Therefore, the second light source 52 is disposed below the first light source 42. In the vertical section, the first light source 42 and the second light source 52 are arranged at positions that are asymmetrical with respect to the optical axis of the projection lens 15. Further, as described above, the normal line of the emitting surface of the first light source 42 faces obliquely forward and downward, and the normal line of the emitting surface of the second light source 52 faces obliquely forward and downward. Therefore, the direction in which the first light is emitted from the first light source 42 and the direction in which the second light is emitted from the second light source 52 intersect each other.

The third light source unit 60 mainly includes a third substrate 61, a third light source 62, and a third connector 63. The third substrate 61 is a plate-like member and is made of for example, metal. The third light source 62 is disposed on the third substrate 61 and emits a third light in conjunction with at least one of an operation of a steering wheel and an operation of a direction indicator in a vehicle. For example, the light amount of the third light is adjusted according to a steering angle of the steering wheel. The third light source 62 in the present embodiment is an LED. Further, the third substrate 61 is fixed to the side of the heat sink 71, and the third light is emitted laterally from the third light source 62. Specifically, the optical axis of the projection lens 15 and the normal line of an emitting surface **62*f* of the third light source 62 are orthogonal to each other as seen from above, and the normal line of the emitting surface 62*f* of the third light source 62 does not pass through the projection lens 15. Further, the third connector 63 is provided on the third substrate 61, and the light emission of the third light source 62 is controlled by an electrical signal inputted to a light emission control circuit (not shown) via the third connector 63**.

Figure 4:
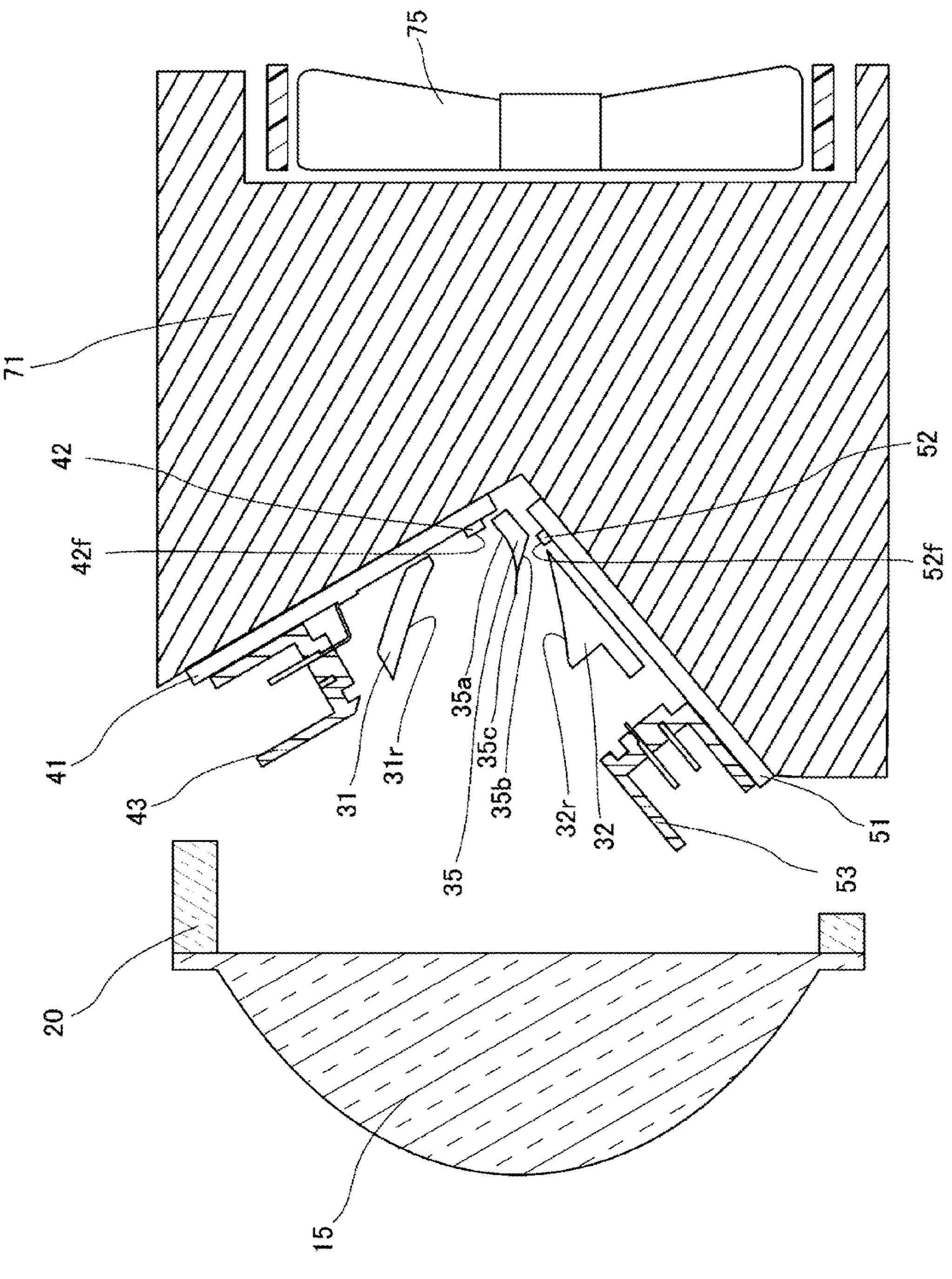
FIG. 4 is a vertical sectional view of the lamp unit shown in FIG. 1.
Figure 5:
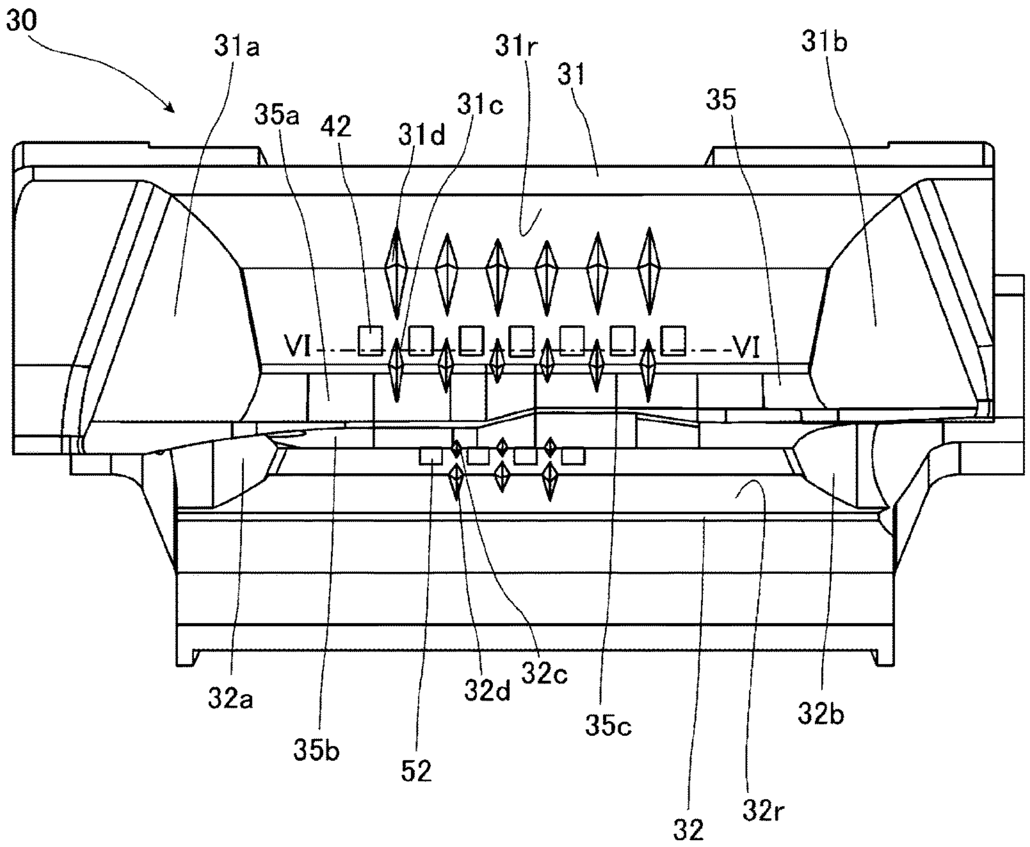
FIG. 5 is a front view of a reflector unit, a first light source, and a second light source shown in FIG. 3.

FIG. 4 is a vertical sectional view of the lamp unit LU shown in FIG. 2. FIG. 5 is a front view of the reflector unit 30, the first light source 42 and the second light source 52 shown in FIG. 3. Meanwhile, although FIG. 5 shows an example where the first light source 42 has seven LEDs and the second light source 52 has four LEDs, the number of LEDs included in the first light source 42 and the second light source 52 is not particularly limited.

The reflector unit 30 mainly includes a shade 35, a reflector 31 for the first light source 42, a first side reflector **31*a* for the first light source 42, a second side reflector 31*b* for the first light source 42, a plurality of first inter-light source reflectors 31*c* for the first light source 42, a plurality of second inter-light source reflectors 31*d* for the first light source 42, a reflector 32 for the second light source 52, a first side reflector 32*a* for the second light source 52, a second side reflector 32*b* for the second light source 52, a plurality of first inter-light source reflectors 32*c* for the second light source 52, and a plurality of second inter-light source reflectors 32*d* for the second light source 52**.

The shade 35 is disposed between the first light source 42 and the second light source 52 and shields a part of the first light. Further, the shade 35 has a first reflective surface **35*a* on the upper surface and a second reflective surface 35*b* on the lower surface. The first reflective surface 35*a* is a concave reflective surface which extends from the side of the first light source 42 toward the projection lens 15 and reflects a part of the first light forward. The second reflective surface 35*b* is a concave reflective surface which extends from the side of the second light source 52 toward the projection lens 15 and reflects a part of the second light forward. Further, a front end 35*c* of the shade 35** has a shape conforming to a cut line (to be described later) and is gradually recessed rearward from the left and right ends toward the center.

The reflector 31 is disposed above the first light source 42 and has a third reflective surface 31*r* covering the upper side of the first light source 42 on the side of the first light source 42. The third reflective surface 31*r* and the first reflective surface 35*a* of the shade 35 are formed along the arrangement direction of a plurality of LEDs included in the first light source 42 and are provided as a pair of reflectors arranged so as to sandwich the plurality of LEDs from the upper and lower sides.

The first inter-light source reflectors 31*c* and the second inter-light source reflectors 31*d* are disposed so as to sandwich a line connecting the mutually adjacent LEDs of the first light source 42 and reflect a part of the light emitted from the first light source 42 toward the projection lens 15. Further, the first inter-light source reflectors 31*c* are formed integrally with the first reflective surface 35*a* of the shade 35, and the second inter-light source reflectors 31*d* are formed integrally with the third reflective surface 31*r* of the reflector 31. Further, the plurality of first inter-light source reflectors 31*c* and the plurality of second inter-light source reflectors 31*d* are juxtaposed along the arrangement direction of the plurality of LEDs included in the first light source 42. Although FIG. 5 shows an example where six first inter-light source reflectors 31*c* and six second inter-light source reflectors 31*d* are formed, the number of the first inter-light source reflectors 31*c* and the second inter-light source reflectors 31*d* is not particularly limited.

Figure 6:
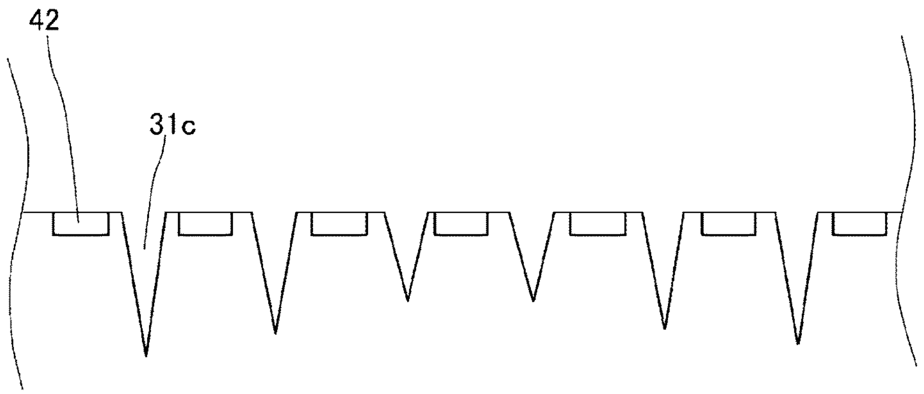
FIG. 6 is a view schematically showing a horizontal section taken along the line VI-VI shown in FIG. 5.

FIG. 6 is a view schematically showing a horizontal section taken along the line VI-VI shown in FIG. 5. Leading ends of the plurality of first inter-light source reflectors 31*c* on the side of the projection lens 15 are positioned gradually closer to the side of the projection lens 15 from the first inter-light source reflector 31*c* disposed at the center toward the first inter-light source reflectors 31*c* disposed at both ends. That is, in the present embodiment, the length in the front and rear direction of the first inter-light source reflectors 31*c* is gradually increased from the first inter-light source reflector 31*c* disposed at the center toward the first inter-light source reflectors 31*c* disposed at both ends.

Although not specifically shown, similar to the plurality of first inter-light source reflectors 31*c*, leading ends of the plurality of second inter-light source reflectors 31*d* on the side of the projection lens 15 are positioned gradually closer to the side of the projection lens 15 from the second inter-light source reflector 31*d* disposed at the center toward the second inter-light source reflectors 31*d* disposed at both ends. That is, in the present embodiment, the length in the front and rear direction of the second inter-light source reflectors 31*d* is gradually increased from the second inter-light source reflector 31*d* disposed at the center toward the second inter-light source reflectors 31*c* disposed at both ends.

The first inter-light source reflectors 31*c* and the second inter-light source reflectors 31*d* in the present embodiment have a substantially rhombic shape in a front view and horizontal widths thereof are narrowed from the rear toward the front. Further, the reflective surfaces of the first inter-light source reflectors 31*c* and the second inter-light source reflectors 31*d* for reflecting the first light in the present embodiment are planar, and corners are respectively formed at the boundary between the first inter-light source reflectors 31*c* and the first reflective surface 35*a*, and at the boundary between the second inter-light source reflectors 31*d* and the third reflective surface 31*r*.

The first side reflector 31*a* is formed at one end of a space sandwiched between the first reflective surface 35*a* of the shade 35 and the third reflective surface 31*r* of the reflector 31 in the arrangement direction of a plurality of LEDs included in the first light source 42. Further, the second side reflector 31*b* is formed at the other end of the space. The first side reflector 31*a* and the second side reflector 31*b* are formed such that an interval therebetween increases from the rear toward the front.

The reflector 32 is disposed below the second light source 52 and has a fourth reflective surface 32*r* covering the lower side of the second light source 52 on the side of the second light source 52. The fourth reflective surface 32*r* and the second reflective surface 35*b* of the shade 35 are formed along the arrangement direction of a plurality of LEDs included in the second light source 52 and are provided as a pair of reflectors arranged so as to sandwich the plurality of LEDs from the upper and lower sides.

The first inter-light source reflectors 32*c* and the second inter-light source reflectors 32*d* are disposed so as to sandwich a line connecting the mutually adjacent LEDs of the second light source 52 and reflect a part of the light emitted from the second light source 52 toward the projection lens 15. Further, the first inter-light source reflectors 32*c* are formed integrally with the second reflective surface 35*b* of the shade 35, and the second inter-light source reflectors 32*d* are formed integrally with the fourth reflective surface 32*r* of the reflector 32. Further, the plurality of first inter-light source reflectors 32*c* and the plurality of second inter-light source reflector 32*d* are juxtaposed along the arrangement direction of the plurality of LEDs included in the second light source 52. Although FIG. 5 shows an example where three first inter-light source reflectors 32*c* and three second inter-light source reflectors 32*d* are formed, the number of the first inter-light source reflectors 32*c* and the second inter-light source reflectors 32*d* is not particularly limited.

Although not specifically shown, similar to the plurality of first inter-light source reflectors 31*c*, leading ends of the plurality of first inter-light source reflectors 32*c* on the side of the projection lens 15 are positioned gradually closer to the side of the projection lens 15 from the first inter-light source reflector 32*c* disposed at the center toward the first inter-light source reflectors 32*c* disposed at both ends. That is, in the present embodiment, the length in the front and rear direction of the first inter-light source reflectors 32*c* is gradually increased from the first inter-light source reflector 32*c* disposed at the center toward the first inter-light source reflectors 32*c* disposed at both ends.

Similar to the plurality of first inter-light source reflectors 31*c*, leading ends of the plurality of second inter-light source reflectors 32*d* on the side of the projection lens 15 are positioned gradually closer to the side of the projection lens 15 from the second inter-light source reflector 32*d* disposed at the center toward the second inter-light source reflectors 32*d* disposed at both ends. That is, in the present embodiment, the length in the front and rear direction of the second inter-light source reflectors 32*d* is gradually increased from the second inter-light source reflector 32*d* disposed at the center toward the second inter-light source reflectors 32*d* disposed at both ends.

The first inter-light source reflectors 32*c* and the second inter-light source reflectors 32*d* in the present embodiment have a substantially rhombic shape in a front view and horizontal widths thereof are narrowed from the rear toward the front. Further, the reflective surfaces of the first inter-light source reflectors 32*c* and the second inter-light source reflectors 32*d* for reflecting the second light in the present embodiment are planar, and corners are respectively formed at the boundary between the first inter-light source reflectors 32*c* and the second reflective surface 35*b*, and at the boundary between the second inter-light source reflectors 32*d* and the fourth reflective surface 32*r*.

The first side reflector 32*a* is formed at one end of a space sandwiched between the second reflective surface 35*b* of the shade 35 and the fourth reflective surface 32*r* of the reflector 32 in the arrangement direction of a plurality of LEDs included in the second light source 52. Further, the second side reflector 32*b* is formed at the other end of the space. The first side reflector 32*a* and the second side reflector 32*b* are formed such that an interval therebetween increases from the rear toward the front.

The projection lens 15 is a plano-convex lens and is disposed in front of the first light source 42 and the second light source 52 at a position where the normal line of an emitting surface 42*f* of the first light source 42 and the normal line of an emitting surface 52*f* of the 15 second light source 52 pass. The first light and the second light are incident from a flat incident surface on the back side of the projection lens 15 and are transmitted through the projection lens. Further, in the present embodiment, a focal point of the projection lens 15 is formed between the front end 35*c* of the shade 35 and the projection lens 15.

The lens holder 20 shown in FIGS. 1 to 4 is disposed between the cooling unit 70 and the projection lens 15. Since the projection lens 15 is fixed to the lens holder 20, and the lens holder 20 is fixed to the cooling unit 70, the relative positions of the projection lens 15, the lens holder 20 and the cooling unit 70 are fixed. Further, since the reflector unit 30, the first light source unit 40, the second light source unit 50, and the third light source unit 60 are fixed to the cooling unit 70, the relative positions of the reflector unit 30, the first light source unit 40, the second light source unit 50 and the third light source unit 60, the projection lens 15, and the lens holder 20 are also fixed.

An optical member 21 for adjusting the light distribution of the third light emitted from the third light source 62 is integrally formed on the lateral side of the lens holder 20 on the side where the third light source 62 is disposed. The optical member 21 in the present embodiment is a convex lens whose width in a direction perpendicular to the incident direction of the third light is increased from the rear toward the front. That is, the width of the optical member 21 in the vertical direction is increased from a rear end 21*a* of the optical member 21 toward a front end 21*b* of the optical member 21. Further, the lens holder 20 in the present embodiment has a cut-out 22 as a through-hole formed between the optical member 21 and the projection lens 15.

Figure 7:
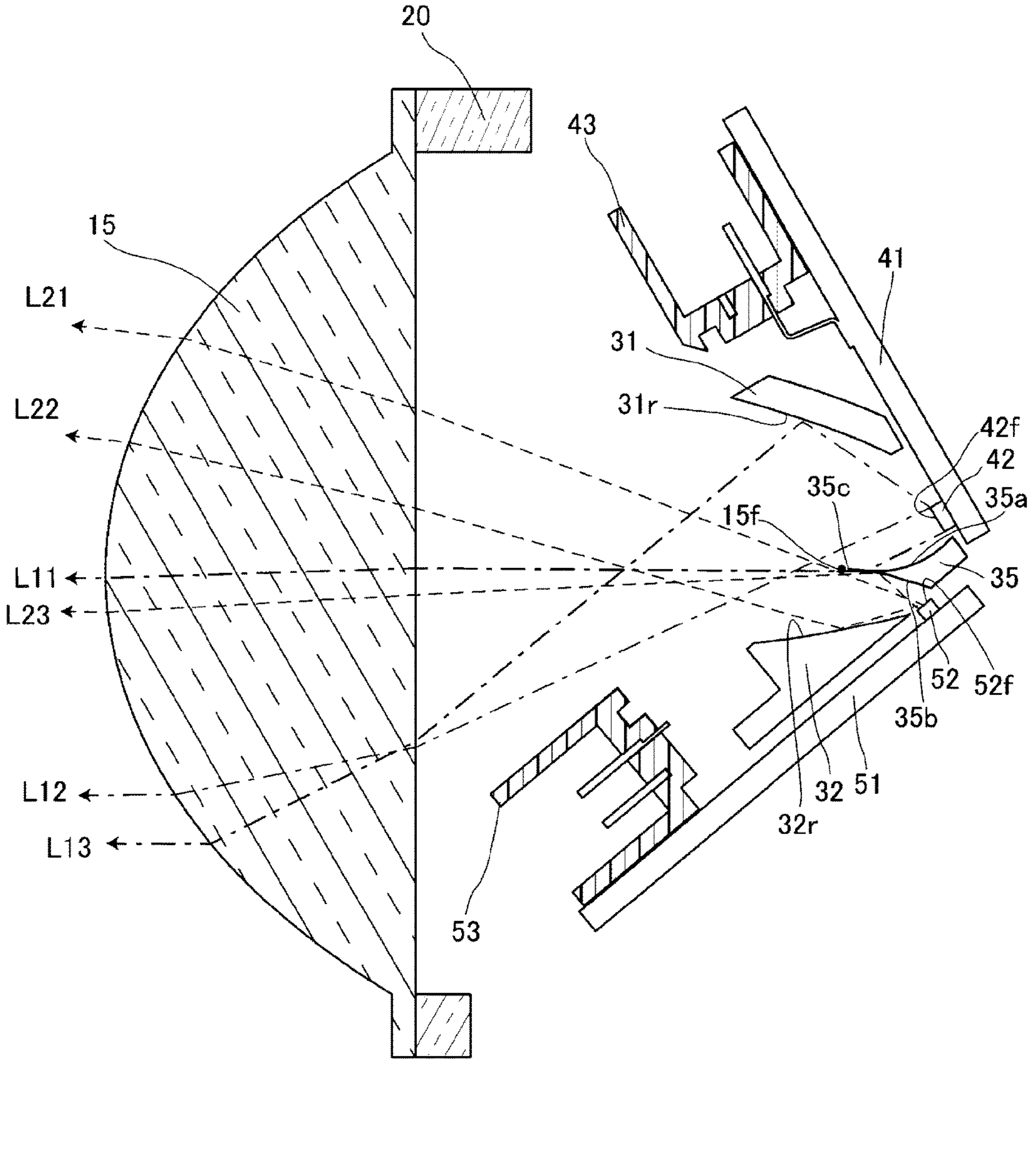
FIG. 7 is an enlarged view of a part of FIG. 4, schematically showing an example of an optical path of light emitted from the first light source and the second light source.

Next, the emission of light from the vehicle headlamp 1 in the present embodiment and the operation of the vehicle headlamp 1 will be described. FIG. 7 is an enlarged view of a part of FIG. 4, schematically showing an example of an optical path of light emitted from the first light source 42 and the second light source 52. Meanwhile, an angle of each reflective surface, and a reflection angle and a refraction angle of light, and the like shown in FIG. 7 may not be accurate in some cases. Further, as described above, the vehicle headlamp is symmetrically provided on the left and right sides of the vehicle. In the following description of the light distribution, the light distribution when the vehicle headlamps provided on the left and right sides are similarly turned on or turned off will be described.

Figure 8A:
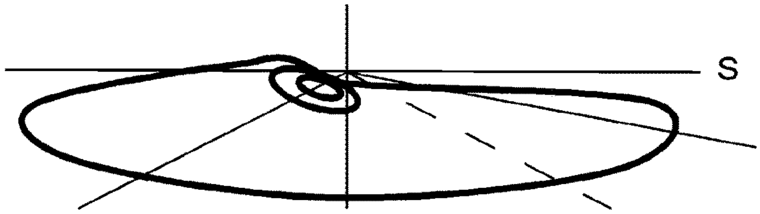
FIG. 8A is a view showing a low-beam light distribution.

As described below, first light L11, L12, L13 emitted from the first light source 42 is incident on the projection lens 15 and transmitted therethrough, and is emitted through the front cover 12, thereby, forming a low-beam light distribution shown in FIG. 8A.

The first light L11, L12, L13 is emitted from the emitting surface 42*f* of each LED included in the first light source 42. In the LEDs, the intensity of the first light L11, L12 emitted vertically from the emitting surfaces 42*f* is relatively stronger than the intensity of the first light L13 emitted in the other direction. Since the normal line of the emitting surface 42*f* of each LED included in the first light source 42 faces obliquely toward the lower front, the first light L11, L12 emitted vertically from the emitting surfaces 42*f* of the first light source 42 is emitted toward the front end 35*c* of the shade 35 and passes near the front end 35*c* of the shade 35 or ahead of the front end 35*c* of the shade 35. Therefore, all or a part of the first light L11, L2 emitted vertically from the emitting surfaces 42*f* of the first light source 42 is irradiated to the vicinity of the front end 35*c* of the shade 35, and the light amount of the first light L11, L12 incident on the front end 35*c* of the shade 35 is increased. Further, out of the first light, a part of the light, which is irradiated to the rear side of the front end 35*c* of the shade 35, is shielded by the shade 35. As a part of the first light is shielded by the shade 35 in this way, the front end 35*c* of the shade 35 can form a cut line of the low-beam light distribution by the first light. In the present embodiment, as described above, a part of the first light is directly incident on the front end 35*c* of the shade 35 where the cut line is formed, and the light amount of the first light incident on the front end 35*c* is increased, so that the vicinity of the front end 35*c* of the shade 35 is likely to become brighter. Here, by forming a focal point 15*f* of the projection lens 15 between the front end 35*c* of the shade 35 and the projection lens 15, that is, in the vicinity of the front end 35*c* of the shade 35, the vicinity of the cut line of the low-beam light distribution can be made brighter. Meanwhile, the front end 35*c* of the shade 35 has a shape conforming to the shape of a desired cut line of the low beam. In the present embodiment, the front end 35*c* of the shade 35 is formed in a concave shape as described above.

At least a part of the first light L12 passing ahead of the front end 35*c* of the shade 35 is directly incident on the projection lens 15. Further, other part of the first light is incident on the projection lens 15 by being reflected forward by any one of the first reflective surface 35*a*, the third reflective surface 31*r*, the first inter-light source reflectors 31*c*, the second inter-light source reflectors 31*d*, the first side reflector 31*a*, and the second side reflector 31*b*.

The first light L11 reflected by the first reflective surface 35*a* is reflected forward with a small divergence angle, and then, is incident on the projection lens 15. Therefore, a predetermined range of the light distribution of the first light can be relatively brighter than the other range. For example, by collecting the first light L11 reflected by the first reflective surface 35*a* in the vicinity of the front end 35*c* of the shade 35, the vicinity of the cut line of the low-beam light distribution can be made brighter.

Further, in the present embodiment, the first reflective surface 35*a* and the third reflective surface 31*r* are provided so as to sandwich a plurality of LEDs included in the first light source 42 from the upper and lower sides. Therefore, it is easy to effectively use the first light emitted from the plurality of LEDs. As described above, most of the first light is directly incident on the projection lens 15 or is incident on the projection lens 15 by being reflected by the first reflective surface 35*a*. In this way, since the third reflective surface 31*r* does not reflect all of the first light, it is possible to suppress an increase in size.

As described above, the first light L11 reflected by the first reflective surface 35*a* is preferably collected in the vicinity of the front end 35*c* of the shade 35. On the other hand, it is preferable that the first light L13 reflected by the third reflective surface 31*r* is irradiated over a wider range to form the light distribution of the first light. Therefore, it is preferable that the first light L13 reflected by the third reflective surface 31*r* is diverged.

Further, since the first inter-light source reflectors 31*c* and the second inter-light source reflectors 31*d* are provided as described above, out of the light emitted from a plurality of LEDs included in the first light source 42, the first light spreading in the arrangement direction of the plurality of LEDs can be reflected toward the projection lens 15. Therefore, it is easy to effectively utilize the light emitted from the plurality of LEDs included in the first light source 42.

Further, the first inter-light source reflectors 31*c* and the second inter-light source reflectors 31*d* are arranged so as to sandwich a line connecting the mutually adjacent LEDs of the first light source 42. Therefore, a gap through which light can pass in a direction parallel to the line connecting the mutually adjacent LEDs is formed between the first inter-light source reflectors 31*c* and the second inter-light source reflectors 31*d*. In this way, out of the light emitted from the plurality of LEDs included in the first light source 42, a part of the light, which is emitted in the direction parallel to the arrangement direction of the plurality of LEDs, can pass between the first inter-light source reflectors 31*c* and the second inter-light source reflectors 31*d*. As such, the light emitted while spreading in a direction parallel to the arrangement direction of the plurality of LEDs included the first light source 42 is not completely shielded by the first inter-light source reflectors 31*c* and the second inter-light source reflectors 31*d*. Therefore, it is possible to suppress the occurrence of a shadow due to the first inter-light source reflectors 31*c* and the second inter-light source reflectors 31*d* in the light distribution of the first light emitted from the plurality of LEDs included in the first light source 42.

Since the first inter-light source reflectors 31*c* and the second inter-light source reflectors 31*d* are formed integrally with the first reflective surface 35*a* and the third reflective surface 31*r*, the relative positions of these reflectors are easily determined, and thus, it is easy to accurately control the light distribution of the first light.

Meanwhile, as described above, a part of the first light can pass between the first inter-light source reflectors 31*c* and the second inter-light source reflectors 31*d*. Therefore, the light emitted from an LED of the LEDs included in the first light source 42 can be also reflected by the first inter-light source reflectors 31*c* and the second inter-light source reflectors 31*d* other than the nearest first inter-light source reflector 31*c* and the second inter-light source reflector 31*d*. For example, the light emitted from the leftmost LED of the LEDs included in the first light source 42 may be reflected by the first inter-light source reflector 31*c* and the second inter-light source reflector 31*d* which are the second from the left or the first inter-light source reflector 31*c* and the second inter-light source reflector 31*d* which are located on the right side than these reflectors, in addition to the first inter-light source reflector 31*c* and the second inter-light source reflector 31*d* which are the first from the left.

Out of the light emitted from the plurality of LEDs included in the first light source 42, a part of the light, which is emitted in a direction parallel to the arrangement direction of the plurality of LEDs, is reflected forward by the first inter-light source reflectors 31*c* and the second inter-light source reflectors 31*d* as described above, and other part thereof passes between the first inter-light source reflectors 31*c* and the second inter-light source reflectors 31*d* as described above. Here, when a plurality of first inter-light source reflectors 31*c* and a plurality of second inter-light source reflectors 31*d* are arranged in parallel as described above, the light passing between the first inter-light source reflectors 31*c* and the second inter-light source reflectors 31*d* is likely to increase cumulatively from the center toward both ends. Thus, as described above, the first inter-light source reflectors 31*c* and the second inter-light source reflectors 31*d* disposed at both ends are provided so as to protrude forward beyond the first inter-light source reflector 31*c* and the second inter-light source reflector 31*d* disposed at the center. By doing so, a relatively small reflector is arranged at a place where light is relatively small, and a relatively large reflector is arranged at a place where light is relatively large. Therefore, it is easy to uniformly reflect the first light emitted from the plurality of LEDs included in the first light source 42 toward the projection lens 15.

Further, since the first inter-light source reflectors 31*c* and the second inter-light source reflectors 31*d* are provided, it is possible to reduce the spread in the front and rear direction of the first light reaching the first side reflector 31*a* and the second side reflector 31*b*. Therefore, it is possible to reduce the size of the first side reflector 31*a* and the second side reflector 31*b*.

Further, since the light is diffused by the first side reflector 31*a* and the second side reflector 31*b*, the light emitted from the LEDs disposed at both ends among the plurality of LEDs included in the first light source 42 can be diffused and emitted in a wide range. Therefore, it is possible to form a wide light distribution even when the number of LEDs included in the first light source 42 is small.

Figure 8B:
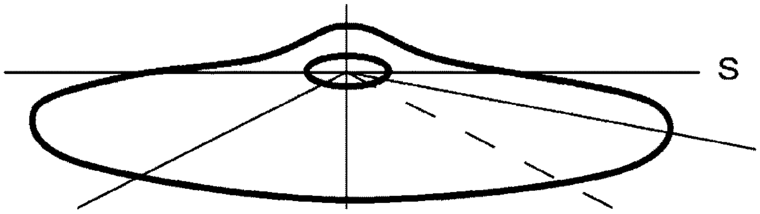
FIG. 8B is a view showing a high-beam light distribution.

As described below, second light L21, L22, L23 emitted from the second light source 52 is incident on the projection lens 15 and transmitted therethrough, and is emitted through the front cover 12. At this time, at least a part of the second light L21, L22, L23 is emitted upward beyond the first light L11, L12, L13. In this way, a light distribution above the cut line is formed by at least a part of the second light L21, L22, L23. Further, a light distribution by the second light emitted from the second light source 52 and a light distribution by the first light emitted from the first light source 42 are combined to form a high-beam light distribution shown in FIG. 8B.

The second light L21, L22, L23 is emitted from the emitting surface 52*f* of each LED included in the second light source 52. Since the normal line of the emitting surface 52*f* of each LED included in the second light source 52 faces obliquely toward the upper front, the second light L23 emitted vertically from the emitting surfaces 52*f* of the second light source 52 is emitted toward the front end 35*c* of the shade 35, and the vicinity of the front end 35*c* of the shade 35 is likely to become brighter. Here, since the focal point of the projection lens 15 is formed in the vicinity of the front end 35*c* of the shade 35 as described above, the vicinity of the cut line, that is, a portion where the light distribution of the first light and the light distribution of the second light overlap with each other can be relatively brighter than the other portions.

At least a part of the second light L21 passing ahead of the front end 35*c* of the shade 35 is directly incident on the projection lens 15. Further, other part of the second light is incident on the projection lens 15 by being reflected forward by any one of the second reflective surface 35*b*, the fourth reflective surface 32*r*, the first inter-light source reflectors 32*c*, the second inter-light source reflectors 32*d*, the first side reflector 32*a*, and the second side reflector 32*b*.

The second light L23 reflected by the second reflective surface 35*b* is reflected forward with a small divergence angle, and then, is incident on the projection lens 15. Therefore, a predetermined range of the light distribution of the second light can be relatively brighter than the other range. For example, by collecting the second light L23 reflected by the second reflective surface 35*b* in the vicinity of the front end 35*c* of the shade 35, a portion where the light distribution of the first light and the light distribution of the second light overlap with each other can be made brighter.

Further, in the present embodiment, the second reflective surface 35*b* and the fourth reflective surface 32*r* are provided so as to sandwich a plurality of LEDs included in the second light source 52 from the upper and lower sides. Therefore, it is easy to effectively use the second light emitted from the plurality of LEDs. As described above, most of the second light is directly incident on the projection lens 15 or is incident on the projection lens 15 by being reflected by the second reflective surface 35*b*. In this way, since the fourth reflective surface 32*r* does not reflect all of the second light, it is possible to suppress an increase in size.

As described above, the second light L23 reflected by the second reflective surface 35*b* is preferably collected in the vicinity of the front end 35*c* of the shade 35. On the other hand, it is preferable that the second light L22 reflected by the fourth reflective surface 32*r* is irradiated over a wider range to form the light distribution of the second light. Therefore, it is preferable that the second light 122 reflected by the fourth reflective surface 32*r* is diverged.

Further, since the first inter-light source reflectors 32*c* and the second inter-light source reflectors 32*d* are provided as described above, out of the light emitted from a plurality of LEDs included in the second light source 52, the first light spreading in the arrangement direction of the plurality of LEDs can be reflected toward the projection lens 15. Therefore, it is easy to effectively utilize the light emitted from the plurality of LEDs included in the second light source 52.

Further, the first inter-light source reflectors 32*c* and the second inter-light source reflectors 32*d* are arranged so as to sandwich a line connecting the mutually adjacent LEDs of the second light source 52. Therefore, a gap through which light can pass in a direction parallel to the line connecting the mutually adjacent LEDs is formed between the first inter-light source reflectors 32*c* and the second inter-light source reflector 32*d*. In this way, out of the light emitted from the plurality of LEDs included in the second light source 52, a part of the light, which is emitted in the direction parallel to the arrangement direction of the plurality of LEDs, can pass between the first inter-light source reflector 32*c* and the second inter-light source reflector 32*d*. As such, the light emitted while spreading in a direction parallel to the arrangement direction of the plurality of LEDs included the second light source 52 is not completely shielded by the first inter-light source reflectors 32*c* and the second inter-light source reflectors 32*d*. Therefore, it is possible to suppress the occurrence of a shadow due to the first inter-light source reflectors 32*c* and the second inter-light source reflector 32*d* in the light distribution of the second light emitted from the plurality of LEDs included in the second light source 52.

Since the first inter-light source reflectors 32*c* and the second inter-light source reflectors 32*d* are formed integrally with the second reflective surface 35*b* and the fourth reflective surface 32*r*, the relative positions of these reflectors are easily determined, and thus, it is easy to accurately control the light distribution of the second light.

Out of the light emitted from the plurality of LEDs included in the second light source 52, a part of the light, which is emitted in a direction parallel to the arrangement direction of the plurality of LEDs, is reflected forward by the first inter-light source reflectors 32*c* and the second inter-light source reflectors 32*d* as described above, and other part thereof passes between the first inter-light source reflectors 32*c* and the second inter-light source reflectors 32*d* as described above. Here, when a plurality of first inter-light source reflectors 32*c* and a plurality of second inter-light source reflectors 32*d* are arranged in parallel as described above, the light passing between the first inter-light source reflectors 32*c* and the second inter-light source reflectors 32*d* is likely to increase cumulatively from the center toward both ends. Thus, as described above, the first inter-light source reflectors 32*c* and the second inter-light source reflectors 32*d* disposed at both ends are provided so as to protrude forward beyond the first inter-light source reflector 32*c* and the second inter-light source reflector 32*d* disposed at the center. By doing so, a relatively small reflector is arranged at a place where light is relatively small, and a relatively large reflector is arranged at a place where light is relatively large. Therefore, it is easy to uniformly reflect the second light emitted from the plurality of LEDs included in the second light source 52 toward the projection lens 15.

Further, since the first inter-light source reflectors 32*c* and the second inter-light source reflectors 32*d* are provided, it is possible to reduce the spread in the front and rear direction of the second light reaching the first side reflector 32*a* and the second side reflector 32*b*. Therefore, it is possible to reduce the size of the first side reflector 32*a* and the second side reflector 32*b*.

Further, since the light is diffused by the first side reflector 32*a* and the second side reflector 32*b*, the light emitted from the LEDs disposed at both ends among the plurality of LEDs included in the second light source 52 can be diffused and emitted in a wide range. Therefore, it is possible to form a wide light distribution even when the number of LEDs included in the second light source 52 is small.

Figure 8C:
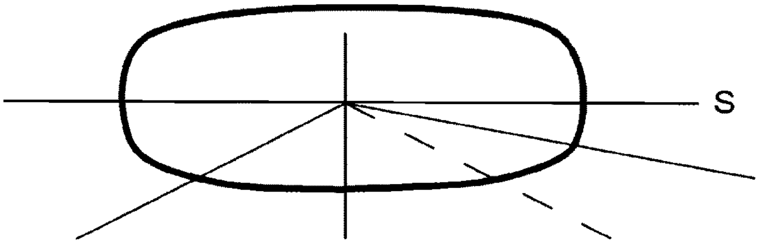
FIG. 8C is a view showing a light distribution of daytime lighting.

Meanwhile, during daytime lighting, at least a part of the plurality of LEDs included in the first light source 42 and the second light source 52 is weakly lit or the like, and thus, the light distribution of the daytime lighting shown in FIG. 8C is formed.

As described above, the third light is laterally emitted from the third light source 62. The third light emitted from the third light source 62 is emitted after its light distribution is adjusted by the optical member 21. As the third light is emitted in this way, it is easy to use the third light source 62 as a light source for irradiating the lateral side of a vehicle. Further, since the optical member 21 is a lens whose width in a direction perpendicular to the incident direction of the third light is increased from the rear toward the front, it is easy to emit the third light obliquely forward and laterally. In addition, since the optical member 21 is a convex lens, it is easy to irradiate the third light in a predetermined range by reducing a divergence angle thereof. Further, since the cut-out 22 is formed between the optical member 21 and the projection lens 15 as described above, it is possible to prevent unintended light from being emitted from the projection lens 15 due to the propagation of the third light from the optical member 21 toward the projection lens 15. In this way, the light distribution of the third light is adjusted by the optical member 21, separately from the first light and the second light.

Meanwhile, as described above, the third light emitted from the third light source 62 interlocks with at least one of an operation of a steering wheel and an operation of a direction indicator in a vehicle and is temporarily irradiated toward the outside of the vehicle in a front view beyond a range where the first light or the second light is irradiated.

The heat generated when the first light source 42, the second light source 52 and the third light source 62 emit light as described above is transmitted toward the heat sink 71 and is cooled by the cooling fan 75. As described above, in the vehicle headlamp 1 of the preset embodiment, the first light source 42, the second light source 52 and the third light source 62 share a single heat sink 71. Therefore, it is not necessary to provide a heat sink or a cooling fan or the like for the third light source 62, separately from a heat sink or a cooling fan for the first light source 42 and the second light source 52. Accordingly, it is possible to suppress an increase in size of the vehicle headlamp 1 while providing the third light source 62 in addition to the first light source 42 as a low-beam light source and the second light source 52 as a high-beam light source. Further, since, as described above, the optical member 21 for adjusting the light distribution of the third light and the projection lens 15 are formed integrally, it is possible to further suppress an increase in size of the vehicle headlamp 1.

Further, as described above, in the vehicle headlamp 1, the normal line of the emitting surface 42*f* of the first light source 42 faces obliquely toward the lower front. Therefore, a part of the first light can be directly incident on the projection lens 15 and other part of the first light can be incident on the projection lens 15 by being reflected by the first reflective surface 35*a* disposed below the first light source 42. In this way, it is possible to effectively utilize the first light. Further, since the normal line of the emitting surface 52*f* of the second light source 52 faces obliquely toward the upper front, a part of the second light can be directly incident on the projection lens 15 and other part of the second light can be incident on the projection lens 15 by being reflected by the second reflective surface 35*b* disposed above the second light source 52. Therefore, it is possible to effectively utilize the second light. Furthermore, since the first reflective surface 35*a* and the second reflective surface 35*b* are formed on one surface and the other surface of the shade 35, the first reflective surface 35*a* and the second reflective surface 35*b* can be formed by a single member. Further, since it is assumed that each of a part of the first light and a part of the second light is directly incident on the projection lens 15, it is not necessary to cause the first reflective surface 35*a* and the second reflective surface 35*b* to largely protrude forward. In this way, in the vehicle headlamp 1, it is possible to make the first light and the second light efficiently incident on the projection lens 15 even without using a large reflector. As a result, the vehicle headlamp 1 is provided with a plurality of light sources for emitting light in directions different from each other and an increase in size thereof can be suppressed while effectively utilizing the light from these light sources.

Although the embodiments of the present invention have been illustratively described above, the present invention is not limited thereto.

For example, in the above embodiments, an example where the first light source is a low-beam light source and the second light source is a high-beam light source has been described. However, the first light source and the second light source are not limited to these forms, but may be light sources for emitting other light.

Further, in the above embodiment, an example where the first light reflected by the first reflective surface 35*a* and the second light reflected by the second reflective surface 35*b* are reflected forward with a small divergence angle has been described. However, one of the first light reflected by the first reflective surface 35*a* and the second light reflected by the second reflective surface 35*b* may have a small divergence angle, or both of them may not have a small divergence angle.

Further, in the above embodiment, an example where the first light reflected by the third reflective surface 31*r* and the second light reflected by the fourth reflective surface 32*r* are diverged has been described. However, one of the first light reflected by the third reflective surface 31*r* and the second light reflected by the fourth reflective surface 32*r* may be diverged, or both of them may be not diverged. Further, the third reflective surface 31*r* and the fourth reflective surface 32*r* are not essential components.

Further, the emission direction of the third light is not particularly limited. For example, the third light may form an overhead sign lamp by being emitted obliquely toward the upper front from the vehicle headlamp. Further, the third light may be a part of the low-beam light distribution or a light for irradiating a travelling line by being emitted obliquely toward the lower front from the vehicle headlamp. Furthermore, the third light may form a light distribution as a clearance lamp (CL) or an auxiliary light distribution as a daytime running lamp (DRL).

Further, the arrangement of the third light source 62 is not particularly limited. For example, the third light source 62 may be disposed above the first light source 42 or may be disposed below the second light source 52. Furthermore, the third light source 62 may be provided on the first substrate 41. In this case, the third light source 62 may be provided apart from the first light source 42 or may be provided so as to emit light in a direction different from that of the first light source 42 by bending the first substrate 41.

Further, the optical member 21 for adjusting the light distribution of the third light may be provided separately from the lens holder 20. Further, the optical member 21 is not limited to a lens, but may be a reflective member or the like for reflecting the third light in a desired direction. The configuration of the optical member 21 can be appropriately changed according to the emission direction of the third light.

Further, in the above embodiment, an example where a through-hole is formed between the lens holder 20 and the projection lens 15 by the cut-out 22 formed in the lens holder 20 has been described. However, from the viewpoint of suppressing the propagation of a pan of the third light to the projection lens 15, a through-hole may be formed in the portion of the lens holder 20 in front of the optical member 21, or a light shielding member may be provided between the optical member 21 and the projection lens 15. However, the present invention is not limited to a form of suppressing the propagation of the third light to the projection lens 15, but a part of the third light may be incident on the projection lens 15.

Further, at least one of the first light source 42, the second light source 52, and the third light source 62 may be disposed on a separate heat sink. For example, one of the first light source 42 and the second light source 52 and the third light source 62 share a single heat sink, and the other of the first light source 42 and the second light source 52 may be disposed on a separate heat sink.

Further, in the above embodiment, an example where the first inter-light source reflectors 31*c*, 32*c* and the second inter-light source reflectors 31*d*, 32*d* are spaced apart from each other has been described. However, the first inter-light source reflectors 31*c*, 32*c* and the second inter-light source reflectors 31*d*, 32*d* may be connected with each other by a transparent member.

Further, in the above embodiment, an example where the first inter-light source reflectors 31*c*, 32*c* and the second inter-light source reflectors 31*d*, 32*d* disposed at both ends are provided so as to protrude forward beyond the first inter-light source reflectors 31*c*, 32*c* and the second inter-light source reflectors 31*d*, 32*d* disposed at the center has been described. However, the first inter-light source reflectors 31*c*, 32*c* and the second inter-light source reflectors 31*d*, 32*d* disposed at the center may be provided so as to protrude forward beyond the first inter-light source reflectors 31*c*, 32*c* and the second inter-light source reflectors 31*d*, 32*d* disposed at both ends. For example, a plurality of first inter-light source reflectors and a plurality of second inter-light source reflectors may be arranged in parallel along the arrangement direction of a plurality of light sources, and leading ends of a plurality of first inter-light source reflectors and leading ends of a plurality of second inter-light source reflectors on the side of the projection lens may be positioned gradually closer to the side of the projection lens from the first inter-light source reflectors and the second inter-light source reflectors disposed at both ends toward the first inter-light source reflectors and the second inter-light source reflectors disposed at the center. Further, the length in the front and rear direction of a plurality of first inter-light source reflectors and a plurality of second inter-light source reflectors may be constant.

Further, in the above embodiment, an example where the reflective surfaces of the first inter-light source reflectors 31*c* and the second inter-light source reflectors 31*d* for reflecting the first light are planar has been described. However, the shapes of the reflective surfaces of the first inter-light source reflectors 31*c* and the second inter-light source reflectors 31*d* for reflecting the first light may be a concave curved surface or the like, and the boundary between the first inter-light source reflectors 31*c* and the first reflective surface 35*a*, and the boundary between the second inter-light source reflectors 31*d* and the third reflective surface 31*r* may be a curved surface, respectively. Similarly, the shapes of the reflective surfaces of the first inter-light source reflectors 32*c* and the second inter-light source reflectors 32*d* for reflecting the 15 second light may be a concave curved surface or the like, and the boundary between the first inter-light source reflectors 32*c* and the second reflective surface 35*b*, and the boundary between the second inter-light source reflectors 32*d* and the fourth reflective surface 32*r* may be a curved surface, respectively.

Further, the first inter-light source reflectors 31*c* and the first reflective surface 35*a* may be separately formed, the second inter-light source reflectors 31*d* and the third reflective surface 31*r* may be separately formed, the first inter-light source reflectors 32*c* and the second reflective surface 35*b* may be separately formed, and the second inter-light source reflectors 32*d* and the fourth reflective surface 32*r* may be separately formed.

As described above, according to the present invention, there is provided a lamp in which the occurrence of a shadow in the light distribution of the light emitted from a plurality of light sources arranged in parallel can be suppressed. This lamp can be used in the field of a headlamp of a vehicle such as an automobile.

As described above, according to the present invention, there is provided a lamp which is provided with a plurality of light sources for emitting light in directions different from each other and in which an increase in size can be suppressed while effectively utilizing the light from these light sources. This lamp can be used in the field of a headlamp of a vehicle such as an automobile.

10 . . . Housing
15 . . . Projection Lens
20 . . . Lens Holder
21 . . . Optical Member
22 . . . Cut-out
30 . . . Reflector Unit
31, 32 . . . Reflector
31*c*, 32*c* . . . First Inter-Light Source Reflector
31*d*, 32*d* . . . Second Inter-Light Source Reflector
31*r* . . . Third Reflective Surface
32*r* . . . Fourth Reflective Surface
35 . . . Shade
35*a* . . . First Reflective Surface
35*b* . . . Second Reflective Surface
35*c* . . . Front End
42 . . . First Light Source
52 . . . Second Light Source
62 . . . Third Light Source
70 . . . Cooling Unit
71 . . . Heat Sink
LU . . . Lamp Unit

The invention claimed is:

1. A lamp comprising:

a plurality of light sources arranged in parallel, a projection lens through which light emitted from the plurality of light sources is transmitted, and a first inter-light source reflector and a second inter-light source reflector which are disposed in between individual light sources of the plurality of light sources and which sandwich a line connecting the light sources adjacent to each other and which are configured to reflect a part of the light emitted from the plurality light sources toward the projection lens.

2. The lamp according to claim 1 further comprising a pair of reflectors formed along an arrangement direction of the plurality of light sources and disposed so as to sandwich the plurality of light sources from upper and lower sides thereof.

3. The lamp according to claim 2, wherein the first inter-light source reflector is formed integrally with one of the pair of reflectors, and wherein the second inter-light source reflector is formed integrally with the other of the pair of reflectors.

4. The lamp according to claim 1, wherein the first inter-light source reflector includes a plurality of first inter-light source reflectors and the second inter-light source reflector includes a plurality of second inter-light source reflectors, and the first inter-light source reflector and the second inter-light source reflector are arranged in parallel along an arrangement direction of the plurality of light sources, and wherein leading ends of the plurality of first inter-light source reflectors on both end sides of the first inter-light source reflector and leading ends of the plurality of second inter-light source reflectors on both end sides of the second inter-light source reflector are positioned gradually closer to the projection lens than leading ends of the plurality of first inter-light source reflectors disposed at a center of the first inter-light source reflector and leading ends of the plurality of second inter-light source reflectors disposed at a center of the second inter-light source reflector.

5. A lamp comprising:
a first light source which emits a first light,
a second light source which is disposed below the first light source and emits a second light,
a projection lens which is disposed in front of the first light source and the second light source and through which the first light and the second light are transmitted, and
a shade which is disposed between the first light source and the second light source and which shields a part of the first light,
wherein the shade comprises:
a first concave reflective surface that extends from a side of the first light source toward the projection lens and reflects a part of the first light forward, and
a second concave reflective surface that extends from a side of the second light source toward the projection lens and reflects a part of the second light forward,
wherein a normal line of an emitting surface of the first light source faces obliquely toward a lower front of the lamp, and
wherein a normal line of an emitting surface of the second light source faces obliquely toward an upper front of the lamp.

6. The lamp according to claim 5, wherein a focal point of the projection lens is formed between a front end of the shade and the projection lens.

7. The lamp according to claim 5, wherein in a vertical cross-section of the lamp, the first light source and the second light source are arranged at positions that are asymmetrical with respect to an optical axis of the projection lens.

8. The lamp according to claims 5, wherein at least one of the first light reflected by the first reflective surface and the second light reflected by the second reflective surface is reflected forward with a small divergence angle.

9. The lamp according to claim 5 further comprising:
a third reflective surface covering an upper side of the first light source, and
a fourth reflective surface covering a lower side of the second light source.

10. The lamp according to claim 9, wherein at least one of the first light reflected by the third reflective surface and the second light reflected by the fourth reflective surface is diverged.

11. The lamp according to claim 5, wherein at least one of the first light source and the second light source includes an LED array.

12. The lamp according to claim 5, wherein a front end of the shade is gradually recessed rearward from left and right ends thereof toward a center thereof.

* * * * *